United States Patent [19]

Hobbs

[11] Patent Number: 5,022,131

[45] Date of Patent: Jun. 11, 1991

[54] TOOL BIT SELECTION DEVICE

[76] Inventor: Edwin L. Hobbs, 3 La Salle Dr., Moraga, Calif. 94556

[21] Appl. No.: 519,636

[22] Filed: May 7, 1990

[51] Int. Cl.[5] ........................ B23Q 3/157; B23B 45/00

[52] U.S. Cl. ........................................ 29/40; 81/36; 81/57.5; 408/35; 408/241 R

[58] Field of Search ........................ 29/568, 40, 39, 41; 408/241 R, 35, 239 R; 81/54, 57.22, 57.36, 57.5, 197.4, 439, 437, 436; 173/163

[56] References Cited

U.S. PATENT DOCUMENTS

| | | | |
|---|---|---|---|
| 2,679,770 | 6/1954 | Carter et al. | 408/241 R |
| 4,241,773 | 12/1980 | Personnat | 81/197.4 |
| 4,509,887 | 4/1985 | Hofling | 408/239 R |
| 4,572,038 | 2/1986 | Graham | 81/439 |
| 4,604,005 | 8/1986 | Russ | 408/35 |
| 4,653,356 | 3/1987 | Golden | 81/57.5 X |
| 4,893,529 | 1/1990 | Lin | 81/439 X |

*Primary Examiner*—William Briggs

*Attorney, Agent, or Firm*—George W. Wasson

[57] ABSTRACT

A tool bit selection device as an accessory for a hand held commercial drill motor is disclosed. The selection device is in the form of a chambered cylinder that is supported on the face of the drill motor. The chambers of the cylinder hold individual tool bits that are adapted to be placed on the driving end of a drive spindle of the drill motor. The support and alignment of the selection device on the drill motor permits the compliance of the tool bit and the drive spindle in pitch, yaw, roll and radial offset. The selection device merely stores and positions the tool bits and does not provide bearing support of the tool bit when in working position.

8 Claims, 2 Drawing Sheets

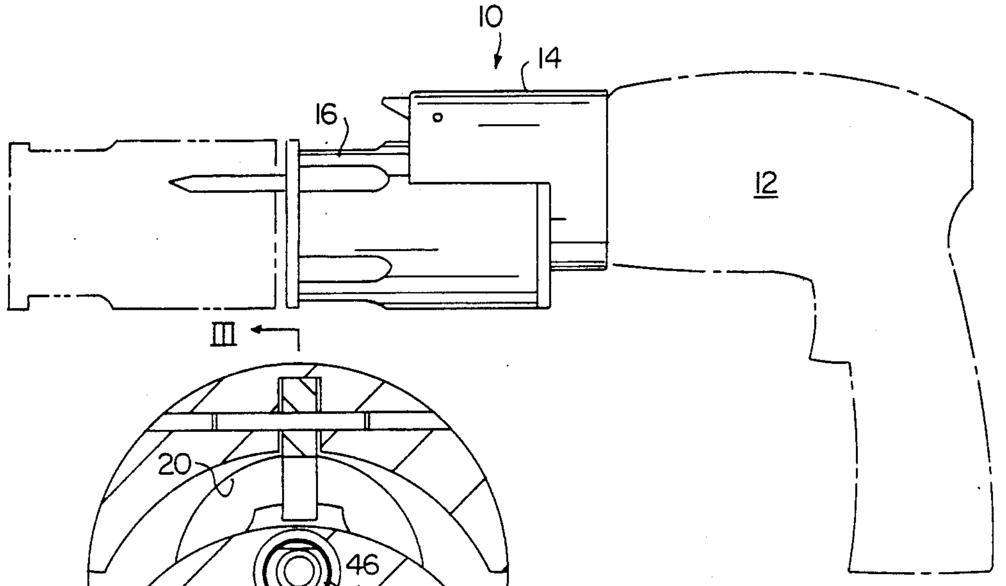
FIG. I
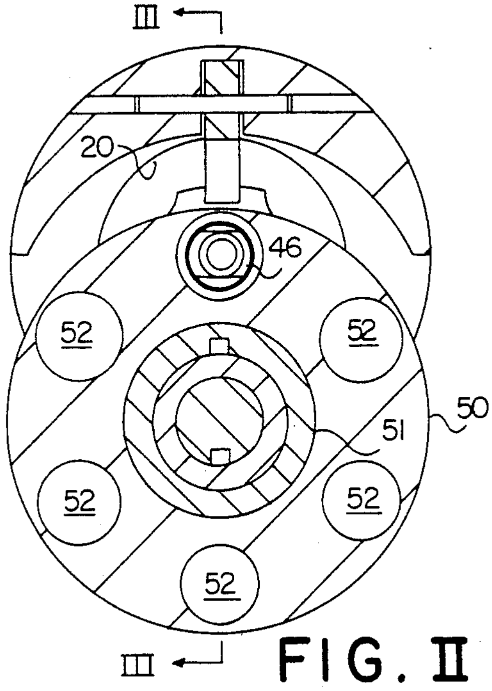
FIG. II
FIG. III
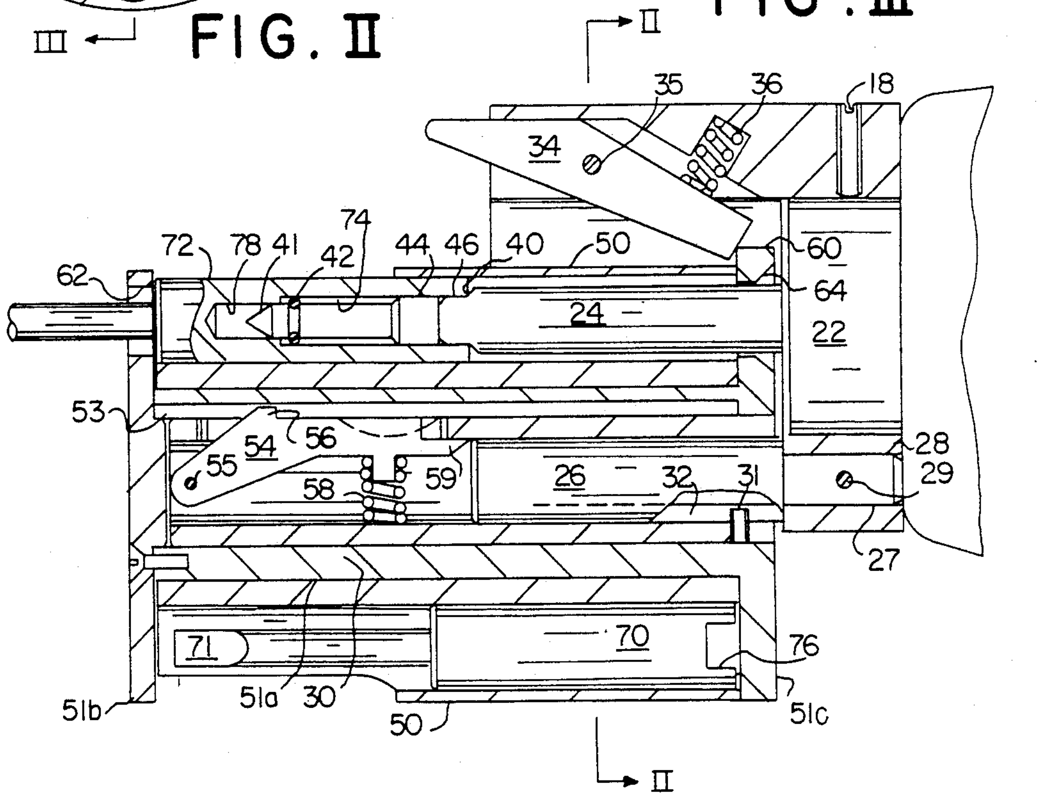

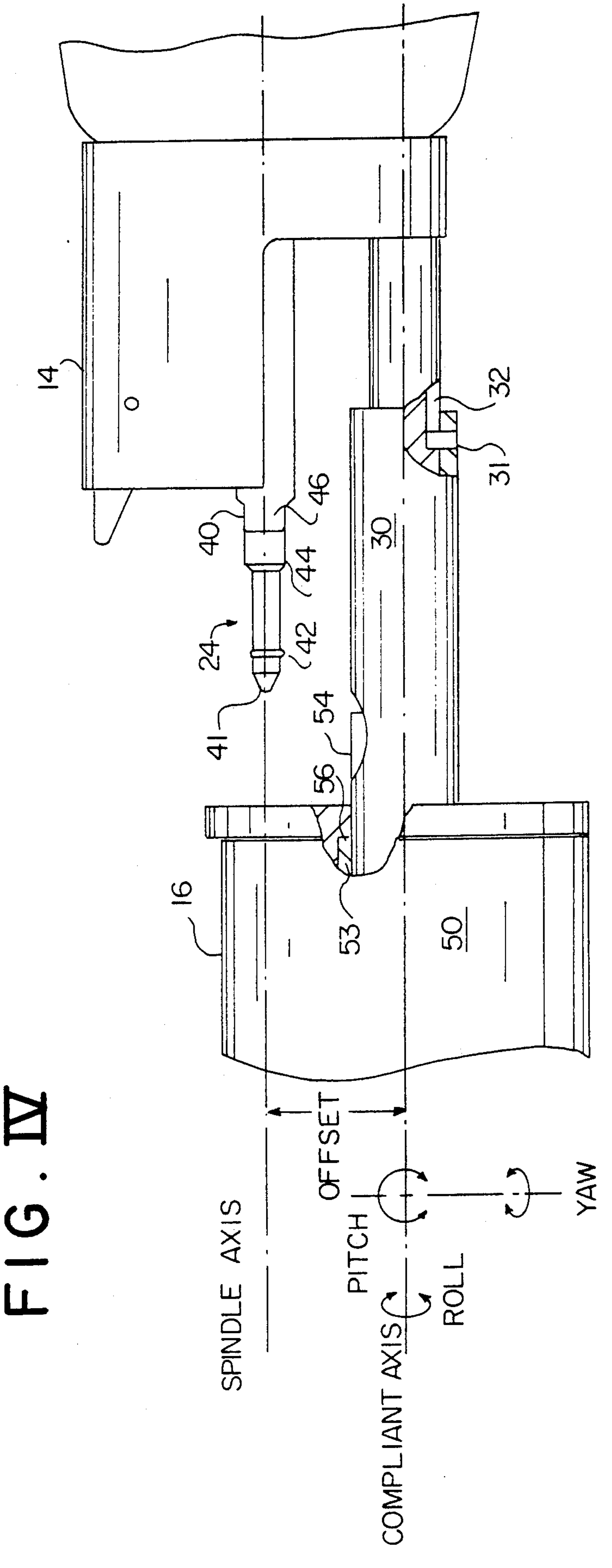
FIG. IV

TOOL BIT SELECTION DEVICE

This invention pertains to a tool bit selection device as an accessory for use with a commercial drill motor to be applied in construction site environment. More particularly, the invention relates to a tool bit selector apparatus that may be attached to a conventional hand-held drill motor in a manner to provide quick access to a variety of tool bits and quick attachment to a selected tool bit to the drive spindle of the drill motor.

BACKGROUND OF THE INVENTION

The conventional hand-held drill motor consists of a drive motor for driving a tool holding chuck with the chuck being tightened on a tool bit with a hand held chuck key. Currently, tool selection at the job site is done entirely by hand; a drill bit or screw driver bit is found, inserted in the three jaw chuck; the chuck key is found; finally the chuck is tightened. This is a time consuming process and often the chuck key or bit is dropped and lost. Also the chuck tends to loosen under load causing the tool in the chuck to slip within the jaws and frequent tightenings of the chuck are required to keep the tool tightly chucked.

DESCRIPTION OF THE PRIOR ART

The prior art as illustrated in U.S. Pat. No. 2,697,770 issued to Carter et al teaches the basics for quick tool bit selection with a configuration much like a revolver type pistol gun. The Carter patent shows a multichambered cylinder adapted to align with a powered driver, each chamber accurately aligning a given tool bit and providing rotational bearing support. However, the bearings of Carter are not sealed and cannot last long at a construction site because of the likelyhood of dirt getting into the bearings. Further, the required accuracy of chamber alignment demands precision fabrication in tool steel with the result that the Carter device would be prohibitively expensive to fabricate. The present invention is an improvement on the prior art as represented by the Carter patent and addresses the issue of ruggedness and cost.

SUMMARY OF THE INVENTION

The time consuming processes of the conventional drill motor system and the difficulties of the prior art are overcome in the present invention by the provision of a tool selector for attachment to a conventional hand-held drill motor in place of the conventional tool chuck. The tool selector is adapted to position selectable tool bits in alignment with a drive spindle of the drill motor and the tools are adapted to be positively attached to the spindle in working position. The tools are retractable into the tool selector in a manner to clean the tool of any debris and the retracted tools are loosely stored in the tool selector when not in use. The tool selector supplys only storage and selection capabilities and does not provide bearing support for the tools.

It is an object of the present invention to provide an improved tool bit selector for use with a conventional hand-held powered drill motor.

A further object of the present invention in accord with the preceeding object is the provision of a drive spindle means that may be attached to a drill motor in a manner to provide for support, alignment and drive of a selected tool bit.

A further object of the present invention in accord with the preceeding objects is the provision of a tool selection apparatus that may be attached to a drill motor in a manner to provide compliant means to allow alignment of a portion of the tool selection apparatus with the drive spindle of the drill motor.

A further object of the present invention in accord with the preceeding objects is the provision of a retractable storage means in the tool selection apparatus for tool bits not in use and so that in the stored position the tool bits are readily available for selective alignment with the drive spindle.

A further object of the present invention in accord with the preceeding objects is the provision of convenient means as a part of the tool selection apparatus for removal of chips and dirt from tools as the tool is positioned within the retractable storage means.

A further object of the present invention in accord with the preceeding objects is the provision of means in the tool selection apparatus for quick selection of tool bits and the positive positioning of the selected tool on the drive spindle.

Further objects and features of the present invention will be readily apparent to those skilled in the art from the appended drawings and specification illustrating a preferred embodiment wherein:

BRIEF DESCRIPTION OF THE DRAWINGS

FIG. I is a side elevational assembly view of the tool selector mounted on a conventional hand-held drill motor with the drill motor shown in phantom and the tool selector shown in retracted and extended position.

FIG. II is a sectional view of the tool selector taken along the lines II—II of FIG. III with the chambers of the tool selector empty.

FIG. III is sectional view of the tool selector taken along the lines III—III of FIG. II and illustrating a tool bit in working position and a tool bit in storage position within a chamber of the tool selector.

FIG. IV is a partial side elevational view showing the tool selector and its support in extended position.

DETAILED DESCRIPTION OF THE DRAWINGS

FIG. I of the drawings illustrates the tool selector 10 mounted on a conventional hand-held drill motor 12. The drill motor is shown in phantom as it can take many forms and is not a part of the present invention except as the tool to which the tool selector 12 is mounted and as the means for driving tools selected from the tool selector. The tool selector 12 has two principal parts; a support collar 14 and a tool selection apparatus 16.

The support collar 14 is attached to the front of the drill motor inn place of the usual conventional three jawed chuck. The mounting of the collar 14 to the front of the drill motor may take many different forms and may vary with different drill motors, it should be understood that the collar is firmly fixed to the face of the drill motor. One such mounting means is by use of a set screw as shown at 18 in FIG. IV. As will be seen later in this description, the collar functions to support and align the tool selection apparatus 16 but does not function in the support of a selected tool when the tool is in working position. The collar 14 also has an open center at 20 that is adapted to fit over the drill motor nose 22 and the drive spindle 24 of the drill motor 12.

At the bottom of the collar, as viewed in FIG. I and more fully shown in FIG. III, a fixed beam 26 is attached to the collar 14 with a reduced diameter portion 27 of the beam fitting into a mounting hole 28 and secured by pin 29. The fixed beam 26 supports a telescoping beam 30 that is adapted to slide axially along the fixed beam between retracted and extended positions. Those positions are determined by the extent of travel of a pin key 31 in keyway 32. Pin key 31 also functions as a anti-rotation pin to prevent the telescoping beam from rotating on the fixed beam.

At the top of the collar, as viewed in FIGS. II and III, a spring loaded latch 34 is supported on a pivot pin 35 and biased by a spring 36. The latch 34 is adapted to cooperate with a flange or lip (to be identified later) of the tool selection apparatus 16 to secure the apparatus 16 on the beam 26.

The drive spindle 24, as shown in FIG. III, has four significant features; it is an elongated cantilevered shaft extending from the drill motor and with a reduced diameter portion extending from a root end 40 and ending in a tapered end 41, it includes a resilient wiper collar 42 near the cantilevered end, it has a reduced diameter tapered shoulder 44 near its root end 40, and includes a transverse drive tang 46 at the root end 40. It will be seen that each individual tool bit that is to be used with this drive shaft will include a drive end configuration that will mate with the drive spindle including a mating slot that will cooperate with the drive tang to transfer rotary motion (either clockwise or counterclockwise) to the tool bit. The construction of the tool bits and the function of the wiper collar will be described hereinafter.

The tool bit selection apparatus 16 is an assembly supported on the collar 14 on the fixed beam 26 and the telescoping beam 30. The fixed beam 26 is cantilevered from the collar 14 with its axis parallel to and offset below the drive spindle 24. The tool bit selection apparatus 16 is essentially a multi chambered cylinder, similar to a revolver pistol cylinder, and is rotatably supported on the cantilever end of the telescoping beam 30, that beam being slideably supported on the fixed beam 26. The tool bit selection apparatus 16 comprises a multi chambered cylinder 50 rotatably supported on a spool 51 with the cylinder 50 having a plurality of individual chambers 52 that will function as tool bit storage areas. The chambers are preferrably cylindrical but can be of any shape that will permit the storage and access to the tool bits. The spool 51 has a hollow central cylinderical shaft 51*a* and a pair of end flanges 51*b* and 51*c*. As is shown in FIG. III the flange 51*b* is removable to permit the assembly of the apparatus 16. The hollow central shaft 51*a* is adapted for sliding support with and on the telescoping beam 30 and includes an internal keyway 53 adapted for cooperation with a spring loaded latch 54 mounted on a pin 55 at the telescoping end of the beam. The latch has a key nib 56 that cooperates with the keyway 53 and the inner surface of the flange 51*c* to limit the travel of the spool 51 on the beam assembly 26/30. The key nib 56 is biased into the keyway by spring 57 and, as will be seen later in this description of the assembly, the latch 54 includes an extension 59 that functions to release the spool from the beam assembly. The cooperation of the keyway 53 in the spool 51 and the latch 54 on the telescoping beam 30 locks the cylinder assembly 50 onto the telescoping beam for telescoping action with respect to the collar 14 while preventing rotation of spool 51. The rotatable support of the multi chambered cylinder 50 on the spool 51 permits the chambers 52 to be rotated about the beam 26 and into alignment with the drive shaft 40. Flange 51*c* of the spool includes a lip 60 that cooperates with the inner end of the spring loaded latch 34 to retain the tool selection assembly 16 in its retracted position along the beam 26 with the drive spindle within a chamber of the spool 51.

The flange 51*b* of the spool 51 at the fore end of the assembly includes a bit hole 62 and the flange 51*c* at the aft end of the assembly includes a spindle hole 64; both of these holes are aligned with the axis of the drive shaft 40. Hole 64 is sized to permit entry of the drive shaft into a chamber 52 holding a tool bit and hole 62 is sized to permit protrusion of a selected tool bit into working position. The hole 62 is further sized with respect to a tool bit and its assembly such that only the working portion of the tool protrudes while the body of the tool is retained within the chamber 52 as will be further described hereinafter.

The cylinder 50 is rotatable on the spool 51 to allow alignment of any chamber 52 with the flange holes 62 and 64. The aligned holes 62 and 64 in the flanges 51*b* and 51*c* are also aligned with the axis of the drive spindle 24; however, the clearances in the junctions of the telescoping beam 30 and the fixed beam 26 allows a significant compliance of alignment in pitch, yaw, roll and radial offset of the tool bit selection apparatus 16 with respect to the drive spindle 24 as identified in FIG. IV. The drive spindle 24 defines the working axis of the tool bit and the selection apparatus complies with that axis as a tool bit is positioned on the drive spindle.

Each individual tool bit 70 to be used with the drill motor accessory 10 of the present invention has a drive end configuration that is adapted to mate with the configuration of the drive spindle 24. Each tool bit 70 includes the working end of the tool 71 attached by suitable means, such as brazing, to a drive end adapter 72. The adapter 72 is formed with an inner axial bore 74 and terminates at the end away from the tool 71 with a drive slot 76 formed transversely across the adapter 72. The bore 74 at the interior of the adapter 72 is enough larger in diameter than the diameter of the drive spindle 24 to permit easy penetration of the spindle into the bore and the width of the slot 76 is slightly larger than the width dimension of the tang 46 of the spindle to permit ease of mating of the tang into the slot. The axial bore is preferrably formed in two diameters with the innermost end being of a smaller diameter at 78 to permit accurate alignment of the tapered end 41 of the drive spindle 24 onto the adapter 72. The larger diameter portion of the bore 74 is adapted to receive the wiper collar 42 of the drive spindle 24 and establishes a snug fit with axial friction and suction between the spindle and the bore as the spindle is removed from the bore thus providing a cleaning action within the bore. It should be noted that the mating action of the drive spindle 24 and the adapter 74 is similar to conventional taper spindle tool holders typical in the machine tool industry but the connection of the present invention does not include the taper, is less precise, easier to release and less sensitive to dirt.

OPERATION OF THE INVENTION

The accessory to the present invention is shown in FIG. I and III with the tool bit selector shown in the operational position with a tool bit 70 projecting from the retracted tool selection apparatus 16 and in FIG. IV in the extended position. To select a different tool bit from one of the chambers 52 in the cylinder 50, the latch 34 is depressed to release the latch tip from engagement with the lip 60 and the apparatus 16 may then be slid forward and away from the collar 14 to the position shown in FIG. IV. As the apparatus 16 is slid outwardly, any tool bit engaged by the drive spindle 24 is drawn into the chamber 52 from where it came and the flange 51c forces the tool adapter 72 off of the drive spindle 24. The resilient wiper collar 42 drags on the inner bore 74 of the adapter 72 to pull the tool back into the chamber and cleans the inner bore. When the selection assembly 16 is in its full forward position, as shown partially in FIG. IV, the drive spindle is clear of the spindle hole 64 and the cylinder 50 may be rotated to align a different chamber with the spindle hole for the selection of a different tool bit 70. It is only necessary to approximately align the chamber and the drive spindle in the selection process. After initial selection, the cylinder assembly is then retracted toward the collar 14 and the whole tool selection apparatus 16 flexes on the telescoping beam 30 to place the cylinder 50 in compliant alignment with the drive spindle 24 and to align the selected tool adapter 24 with the tapered end of the drive spindle. When fully retracted toward the collar, the newly selected tool bit 70 will be supported on the drive spindle 24 with the working tip of the tool bit projecting from the bit hole 62 and the latch 34 will again engage the lip 60 to hold the assembly in the retracted position. If the tang 46 and drive slot 76 are not in mating alignment, a slight rotation of the drive shaft will finalize the alignment so that full axial engagement can be accomplished.

It should be noted that a plurality of separate tool selection apparatus may be provided with different multi chambered cylinders holding different tool bits within its chambers. The cylinders 50 may be removed from the telescoping beam 30 when the cylinder is retracted away from the collar 14 by depressing the extension 59 which will then be exposed between the inner flange 51c and the lower end of the collar 14 as shown in FIG. IV. Other tool selection apparatus may then be positioned on the telescoping beam 30 and latched in place. Also, with the cylinder removed, the drive spindle is available to accomodate a large diameter tool bit that can be hand loaded onto the drive spindle.

The tool selection apparatus may be manufactured from strong plastic materials such as Lexan and Nylon. No bearings are required within the apparatus as the tool bits are only aligned by the apparatus not supported for rotation therein. The support of a tool bit is entirely on the drive spindle when the tool bit is in working position.

A further feature of the tool selection apparatus when mounted on a hand-held drill motor is the convenience of additional hand support for the drill motor. When the apparatus is in the position shown in full lines in FIG. I, the user of the drill motor may hold the assembly at the cylinder 50 while the drill motor is in use.

It should be apparent that the tool accessory of the present invention provides an improvement to the selective tool device art in the form of an apparatus compatable with the harsh environment of construction sites, having mostly nonprecision components favorable to low cost, and having modes of operation that can be used in many situations. The tool accessory provides the user with a plurality of tool bits readily and immediately accessible at the drill motor with simple hand maneuverings.

While a certain preferred embodiment of the invention has been specifically disclosed, it should be understood that the invention is not limited thereto as many variations will be readily apparent to those skilled in the art and the invention is to be given it broadest possible interpertation within the terms of the following claims.

I claim:

1. A drill motor accessory comprising:

a) at least one tool bit having a driven end adapted with spindle engagement means, b) a drive spindle having an axis of rotation and means to engage, align, support and drive said tool bit on said drive spindle, c) cylinder having chambers therein and including means for aligning said tool bit with respect to said drive spindle, means associated with said cylinder for confining said tool bit within a chamber of said cylinder except when said chamber continuing said tool bit is aligned with said drive spindle, said chambers allowing radial and axial movement of said tool bit in a chamber, d) and a support means on said drill motor for rotatably supporting said chambered cylinder, said support means including means for aligning said chambered cylinder with said axis of rotation of said drive spindle to permit compliance of said tool bit to said drive spindle in pitch, yaw, roll and radial offset, c) whereby said support means and said chambered cylinder are adapted to permit movement of said tool bit into alignment with said drive spindle and axial engagement of said drive spindle with said spindle engagement means of said tool bit to align, support and drive said tool bit on said drive spindle.

2. In a multipurpose tool bit selection device adapted to provide a plurality of working tool bits at an operating end of a driving tool, said tool having a drive spindle for driving said working tool bits, said working tool bits being housed within a spool assembly and said spool assembly being adapted to be supported at said operating end of said tool, the improvement comprising:

a) said spool assembly adapted to house said working tool bits for free radial and axial movement within said assembly in separate spool chambers, b) said drive spindle having a driven end and a distal end, tool bit engagement means on said distal end of said drive spindle to provide for positive connection to a working tool bit, c) said working tool bits housed within said spool assembly having a driven end and a working end, said driven end having drive spindle engagement means for positive connection of said tool bit to said distal end of said drive spindle, d) said support of said spool assembly at said operating end of said tool including support means adapted for selectively placing one of said separate spool chambers of said spool assembly in alignment with said drive spindle and for initially directing said drive spindle engagement means to said tool bit engagement means, and continued axial movement of said spool assembly toward said drive spindle causing compliance of said drive spindle engagement means of said working tool bit with said tool bit engagement means of said drive spindle and movement of said working tool bit out of said spool assembly on said drive spindle and into working position for said tool.

3. The multipurpose tool bit selection device of claim 2 wherein said support means for said spool assembly includes a fixed beam having its axis parallel to said drive spindle and a telescoping beam supported on said fixed beam in a manner to provide for axial movement of said spool assembly on said fixed beam, and said spool assembly includes means adapted to permit said spool assembly to b rotatable about said telescoping beam.

4. The multipurpose tool bit selection device of claim 2 wherein said driven end of said working tool bit has an internal axial bore portion, the internal diameter of said axial bore being adapted to receive said distal end of said drive spindle and having an axial length at least as long as said drive spindle, said internal diameter of said axial bore being a constant diameter, and the termination of said driven end of said working tool bit having a radial drive slot adapted to mate with a portion of said drive spindle so as to provide said positive connection between said drive spindle and said working tool bit.

5. The multipurpose tool bit selection device of claim 2 wherein said spool assembly includes an entrance port for said drive spindle and an exit port for said working tool bit, said entrance and exit ports being axially aligned and positionable with support of said spool assembly on said support means so as to be aligned with said drive spindle of said driving tool.

6. The multipurpose tool bit selection device of claim 2 wherein said support means includes means for latching said spool assembly on said support means in working relationship with said driving tool, said latching means including means for releasing said latch to permit said spool assembly to be moved axially along said support means whereby said chambers of said spool assembly may be rotated to provide for selection of a working tool bit.

7. The multipurpose tool bit selection device of claim 3 wherein said telescoping beam support of said spool assembly includes spool latching means for limiting axial movement of said spool assembly with respect to said support means, said spool latching means including means for releasing said spool assembly from said telescoping beam to permit removal and replacement of said spool assembly.

8. In a multipurpose tool bit selection device adapted to provide a plurality of working tool bits at an operating end of a driving tool, said tool having a drive spindle for driving said working tool bits, said working tool bits being housed within a spool assembly and said spool assembly being adapted to be supported at said operating end of said tool, the improvement comprising:

a) a support collar for said spool assembly adjacent to said operating end of said tool in cooperating alignment with said drive spindle, said support collar providing support means for axial movement of said spool assembly with respect to said operating end of said tool and for rotary movement of said spool assembly about said support means, b) said support collar for said spool assembly including a fixed beam having its axis parallel to said drive spindle and a telescoping beam supported on said fixed beam in a manner to provide for axial movement of said spool assembly on said fixed beam, c) said spool assembly including means adapted to permit said spool assembly to be rotatable about said telescoping beam, d) said spool assembly adapted to house said working tool bits within said assembly in separate spool chambers whereby said working tool bits are free for radial and axial movement in separate spool chambers, e) said separate chambers providing a plurality of working tool bit compartments each radially equally spaced from the center of said spool assembly and each compartment being adapted for positioning a working tool bit in alignment with said drive spindle, f) said drive spindle having a driven end, an intermediate reduced diameter portion, and a distal end, said distal end terminating with a tapered tip portion and said driven end terminating with a male transverse drive tang portion, g) said working tool bits housed within said spool assembly having a driven end and a working end, said driven end having an internal axial bore portion, the internal diameter of said axial bore being adapted to receive said tapered tip portion of said drive spindle and having an axial length at least as long as said intermediate reduced diameter portion and said tapered tip portion of said drive spindle, said internal diameter of said axial bore being larger than the diameter of said intermediate reduced diameter portion of said drive spindle and being a constant diameter, the termination of said driven end of said working tool bit having a radial drive slot adapted to mate with said transverse drive tang portion of said drive spindle, h) said rotatable support of said spool assembly adapted for selectively placing one of said plurality of said chambers of said spool assembly in alignment with said drive spindle and said axial movement of said spool assembly on said support means adapted for initially directing said tapered tip portion of said drive spindle into said axial bore of said working tool bit and to align said transverse drive tang portion of said spindle with said drive slot of said working tool bit, continued axial movement of said spool assembly toward said support collar causing said working tool bit to be engaged with said drive means and to be moved out of said spool assembly and into working position for said tool, i) movement of said spool assembly away from said support collar adapted for retracting said working tool bit into said spool assembly and to release said tapered tip from said axial bore of said tool bit.

* * * * *